Aug. 7, 1962     A. O. FITZNER     3,048,832
POSITION INDICATING MEANS FOR MACHINE TOOLS
Filed Dec. 12, 1957     8 Sheets-Sheet 1

INVENTOR.
Arthur O. Fitzner
BY
Carlson, Pitzner, Hubbard & Wolfe
Attys.

Aug. 7, 1962 A. O. FITZNER 3,048,832
POSITION INDICATING MEANS FOR MACHINE TOOLS
Filed Dec. 12, 1957 8 Sheets-Sheet 3

INVENTOR.
Arthur O. Fitzner
BY
Carlson, Pitzner, Hubbard & Wolfe
Attys.

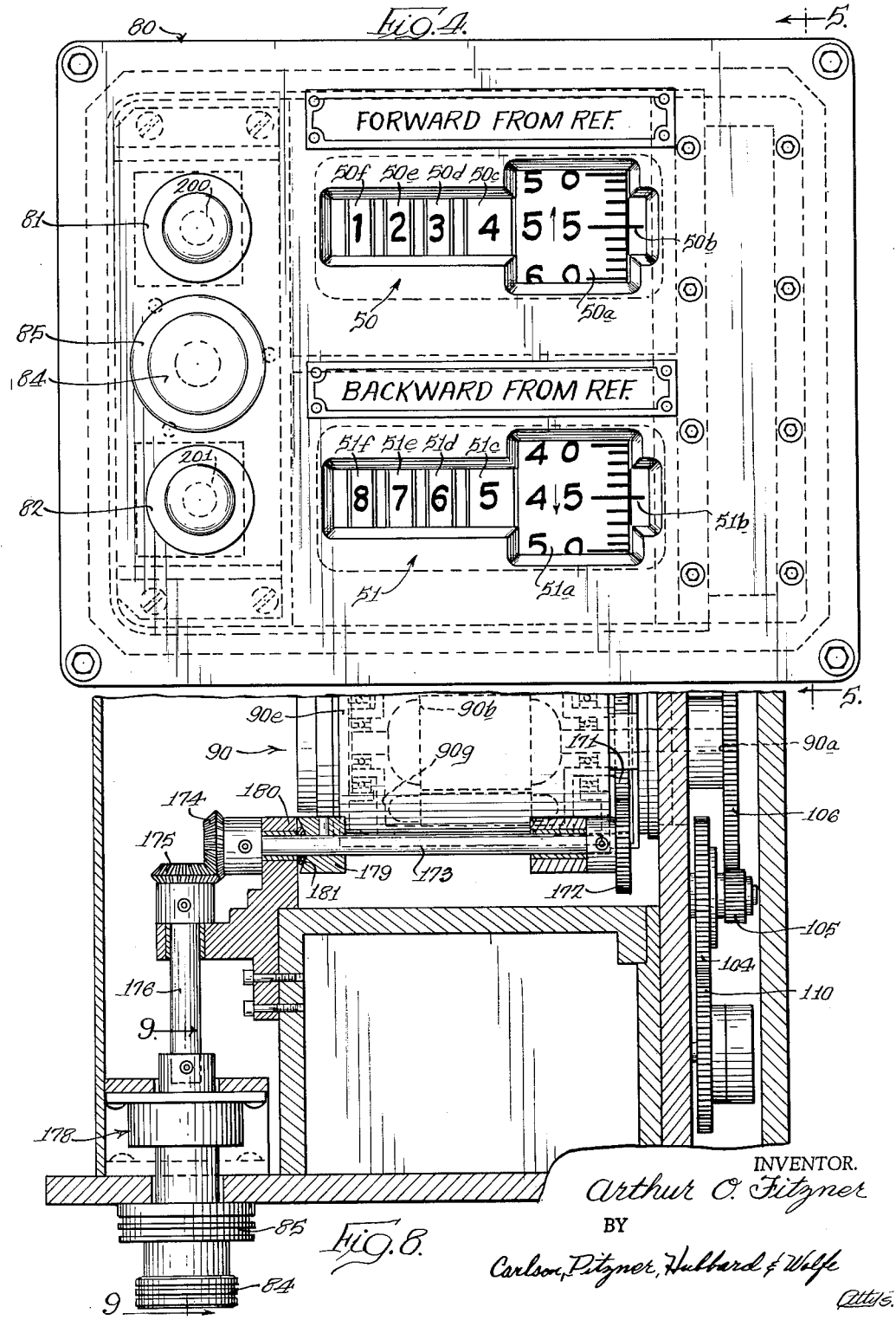

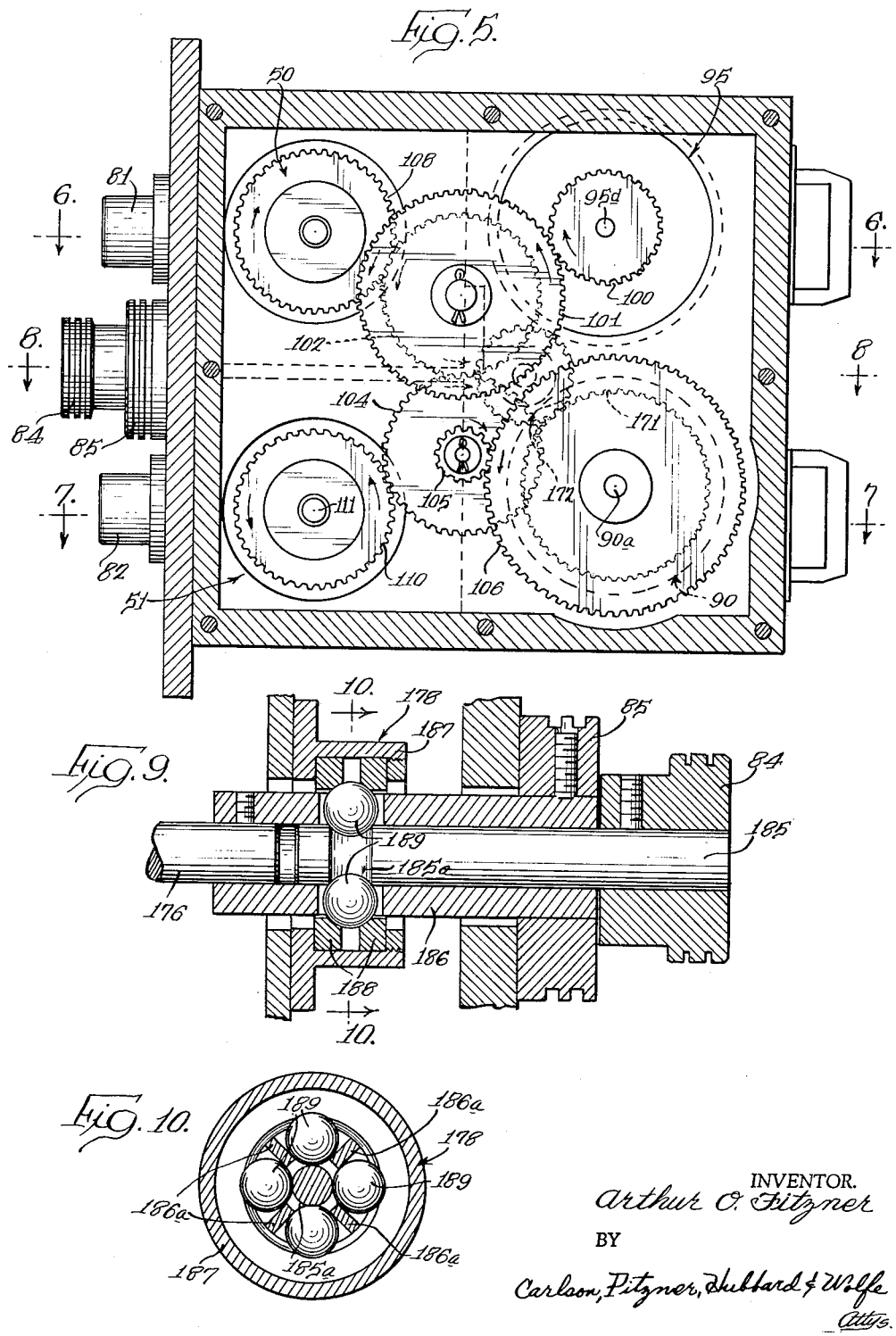

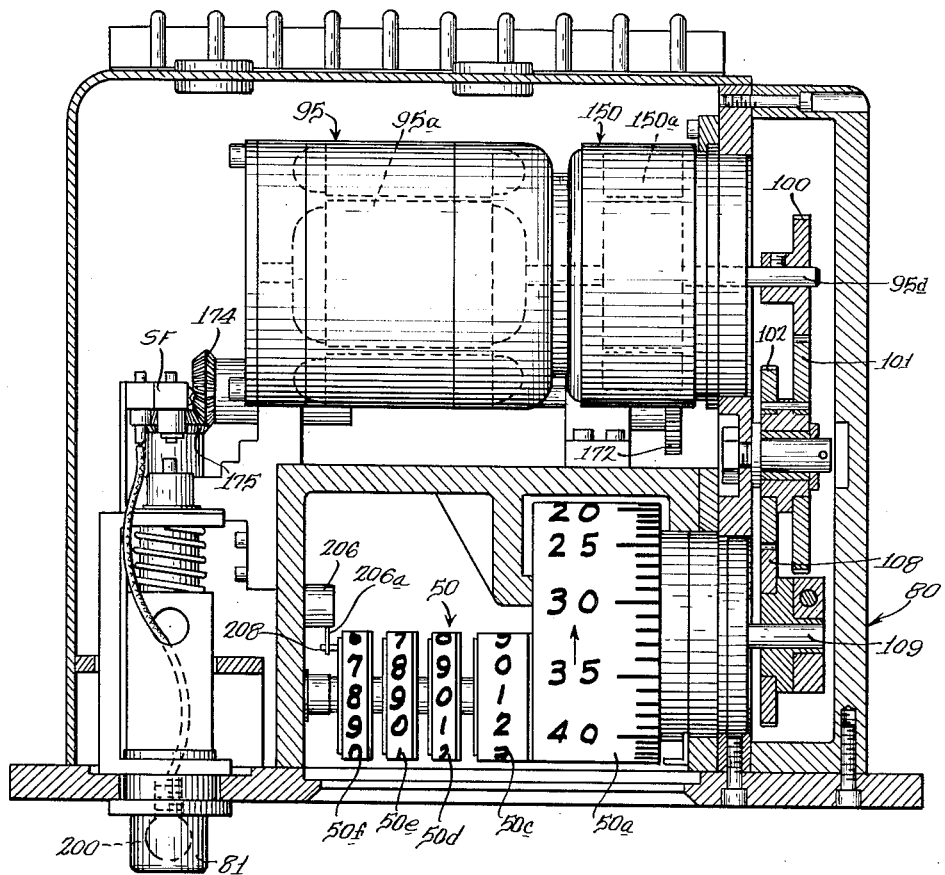

Aug. 7, 1962  A. O. FITZNER  3,048,832
POSITION INDICATING MEANS FOR MACHINE TOOLS
Filed Dec. 12, 1957  8 Sheets-Sheet 7
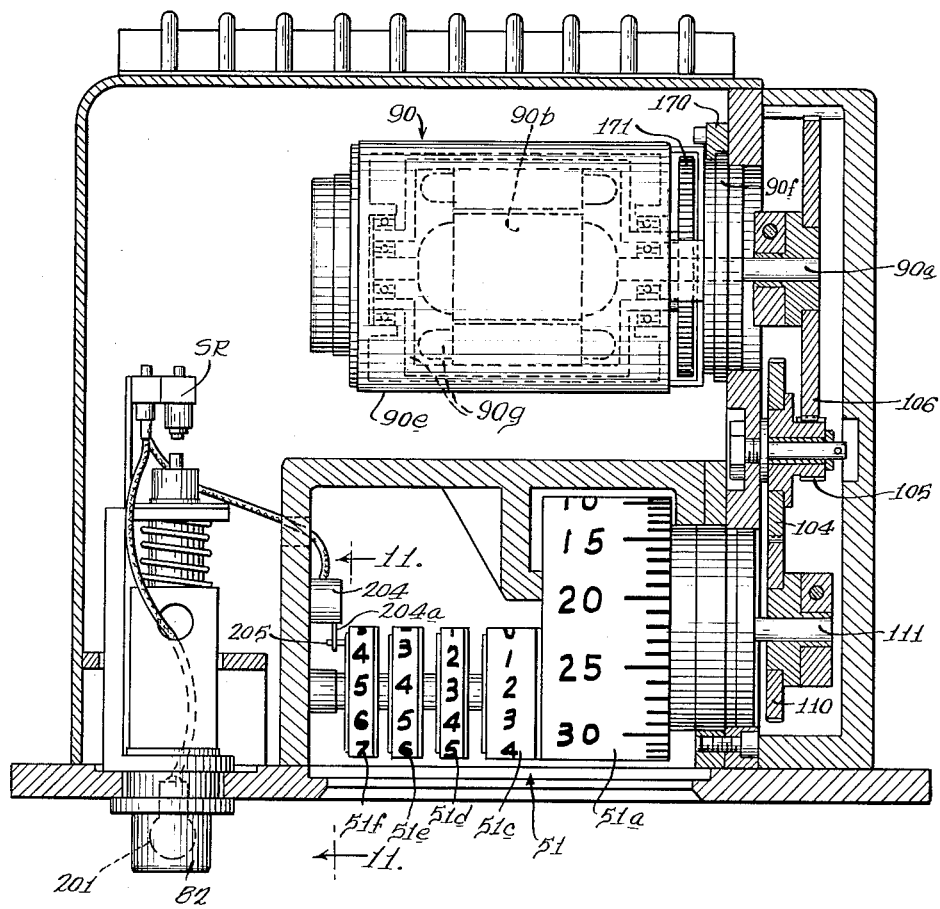
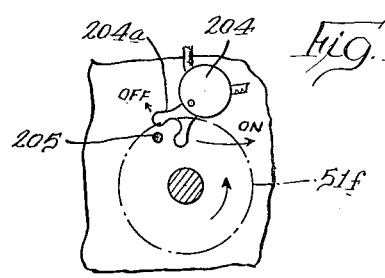
INVENTOR.
Arthur O. Fitzner
BY
Carlson, Pitzner, Hubbard & Wolfe
Attys

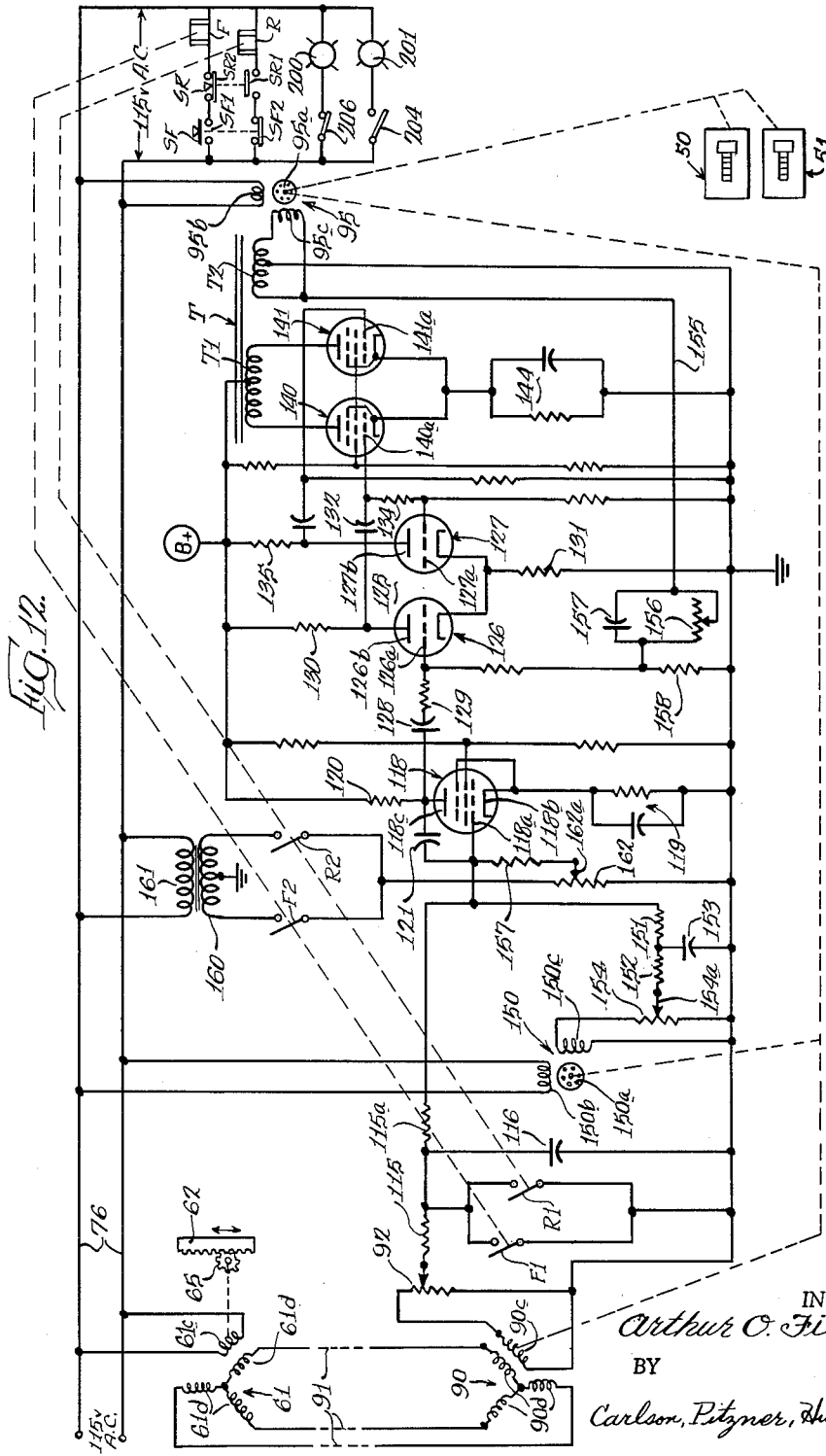

United States Patent Office 3,048,832
Patented Aug. 7, 1962

3,048,832
POSITION INDICATING MEANS FOR
MACHINE TOOLS
Arthur O. Fitzner, Fond du Lac, Wis., assignor to Giddings & Lewis Machine Tool Company, Fond du Lac, Wis., a corporation of Wisconsin
Filed Dec. 12, 1957, Ser. No. 702,337
11 Claims. (Cl. 340—187)

This invention relates in general to machine tools and in particular to means for indicating precisely the positions of machine tool elements which are movable in opposite directions. While the invention will find advantageous application on a variety of machine tools, it is especially useful with very large machines which previously presented difficulties and inconvenience to an operator in observing the movable part he was positioning while staying in touch with his controls and position-indicating dials.

The general aim of the invention is to make it possible for the operator of a machine tool to keep both his positioning controls and his numerical indicators with him as he moves around or over the machine, thereby facilitating his visual inspection of the relative positions of movable elements while permitting him to adjust precisely the positions of such elements.

It is an additional object of the invention to provide an improved system for numerically indicating at remote locations the positions or displacements of movable machine tool elements relative to a reference position which can be selectively changed.

Still another object is to afford at all times a direct numerical reading of the displacement of a movable machine tool element from a reference position, regardless of whether the element is displaced in a positive or a negative direction.

Still another object of the invention is to provide two numerical indications of the displacement of a movable machine tool element from a reference position, one such indication reading positively with positive displacements, and the other reading positively with negative displacements, together with an automatic designation as to which of the two indications directly represents the position of the element.

A further object is to provide, in such an indicating system, for fast and convenient changes in the reference position from which distances are measured. In this connection, it is a related object to effect changes in the reading of the numerical indicator independently of the position of the associated machine tool element by power means, and specifically by utilizing the same motor both for keeping a numerical indicator in step with a movable tool telement and for setting that numerical indicator to a desired reference reading.

It is an additional object to provide such an indicating system utilizing self-synchronous components to establish an electrical tie between a movable machine element and a remotely located numerical indicator, and characterized by an especially simple and effective means for adjusting the reference reading of the indicator to a precise value falling between the null points of the synchronous devices.

Finally, it is an object of this invention to provide a synchro tie system capable of indicating the position of a movable machine tool telement with high accuracies, e.g., to the nearest thousandths of an inch, and in which the indicator follows effectively even though the movable element is abruptly accelerated and traversed at high velocities.

Other objects and advantages will become apparent as the following description proceeds, taken in conjunction with the accompanying drawings, in which:

FIG. 4 is an elevational view showing the face of a read-out unit and the dials of numerical indicators therein;

FIG. 5 is a vertical section, taken substantially along the line 5—5 in FIG. 4, through the read-out unit;

FIGS. 6, 7 and 8 are horizontal sections, taken substantially along the lines 6—6, 7—7, and 8—8, respectively, in FIG. 5, and showing structural details of the read-out unit;

FIGS. 9 and 10 are detail views, taken substantially along the lines 9—9 in FIG. 8 and 10—10 in FIG. 9, respectively, showing the planetary mechanism for effecting coarse and fine adjustments of the reference reading;

FIG. 11 is a detail view taken in section substantially along the line 11—11 in FIG. 7 and showing a switch and its actuating mechanism for sign or direction determination; and FIG. 12 is a schematic diagram of the electrical components and connections for the entire system.

While the invention has been shown and is described in some detail with reference to particular embodiments thereof, there is no intention that it thus be limited to such detail. On the contrary, it is intended here to cover all modifications, alternative constructions and equivalents falling within the spirit and scope of the invention as defined by the appended claims.

Figure 1:
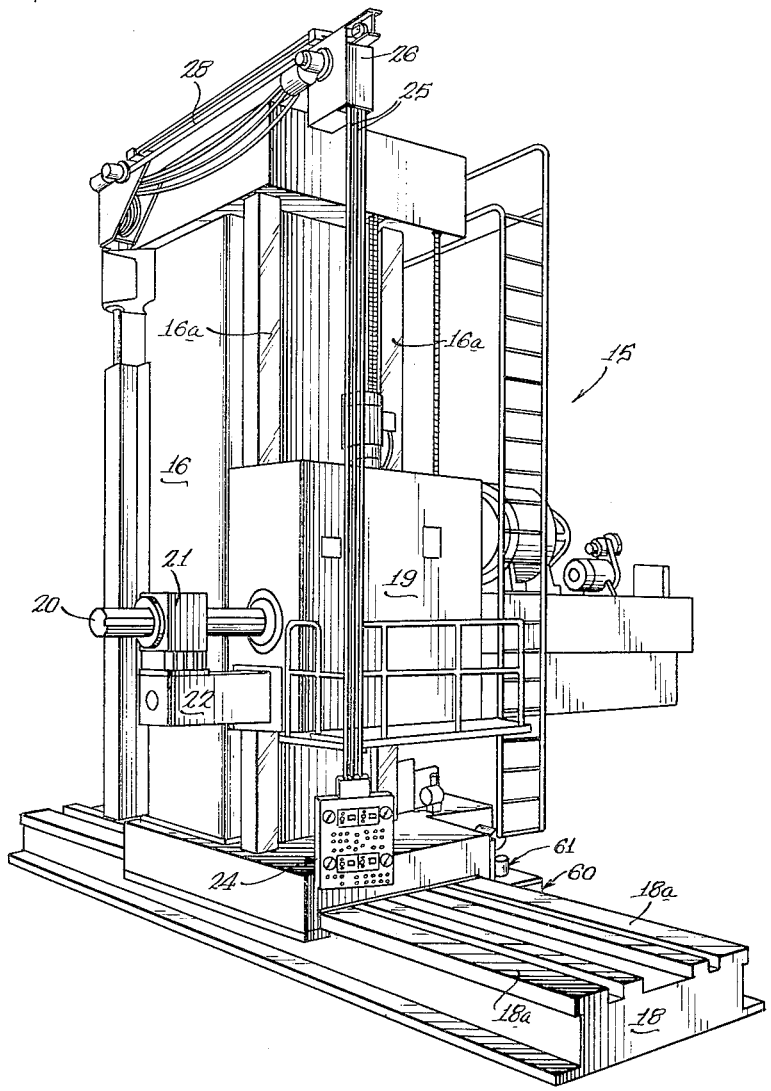
FIGURE 1 is a perspective illustration of a large exemplary machine tool equipped with a position indicating system embodying the features of the invention.

Referring now to FIG. 1, an exemplary machine tool selected to make clear the environment of the invention is there illustrated as a large horizontal boring, drilling and milling machine 15. It comprises an upright column 16 which is movable backwardly and forwardly along the ways 18a of a base 18. A headstock 19 is located at the front side of the column 16 and adapted to move upwardly and downwardly along vertical ways 16a. Carried by the headstock is a spindle 20 which may be partially supported by a bearing member 21 mounted on an underarm 22 projecting from the headstock. As is well known, provision is made within the headstock 19 to drivingly rotate the spindle 20 in either direction and at any of a plurality of speeds, so that with a cutting tool mounted on the spindle, a variety of machining operations can be accomplished at different locations by moving the column 16 back and forth along the base, the headstock 19 upwardly and downwardly along the column, and the spindle 20 as well as the underarm 22 inwardly and outwardly relative to the headstock.

Because the motor drives for translating the column along the base, the headstock vertically along the column, and the spindle and underarm inwardly or outwardly relative to the headstock are well known to those skilled in the art, they have not been shown in the present instance. Generally, motor drives are provided through appropriate reversible speed change transmissions for effecting these relative feeding movements of the column 16, the headstock 19, the spindle 20 and the underarm 22.

With a machine such as that illustrated in FIG. 1, the operator needs to move about in order to inspect the progress of the machining work, and to see that all of the various components are operating properly. Yet, the operator must also accurately position each of the movable elements, or terminate feeding movements thereof when they have reached predetermined positions. Despite the size of the machine, accuracies of positioning to the nearest thousandths of an inch are desirable and sometimes vitally necessary.

To permit the operator to control the movement and positioning of the column 16, the headstock 19, the spindle 20 and the underarm 22 while standing in any of a variety of locations, the present machine is provided with a pendant 24 suspended by means which permit it to be moved about, either horizontally or vertically, at will. As here shown, the pendant is suspended by cables 25 from a trolley 26 movable along a boom 28 which is pivoted at its rear end to swing about a vertical axis. Power means may be provided to drive the trolley 26 inwardly or outwardly along the boom 28, and to take up or lengthen the cables 25 to raise or lower the pendant. With such an arrangement, and by virtue of the fact that the cables 25 are flexible, an operator may move the pendant 24 to almost any desired position relative to the machine tool.

Figure 2:
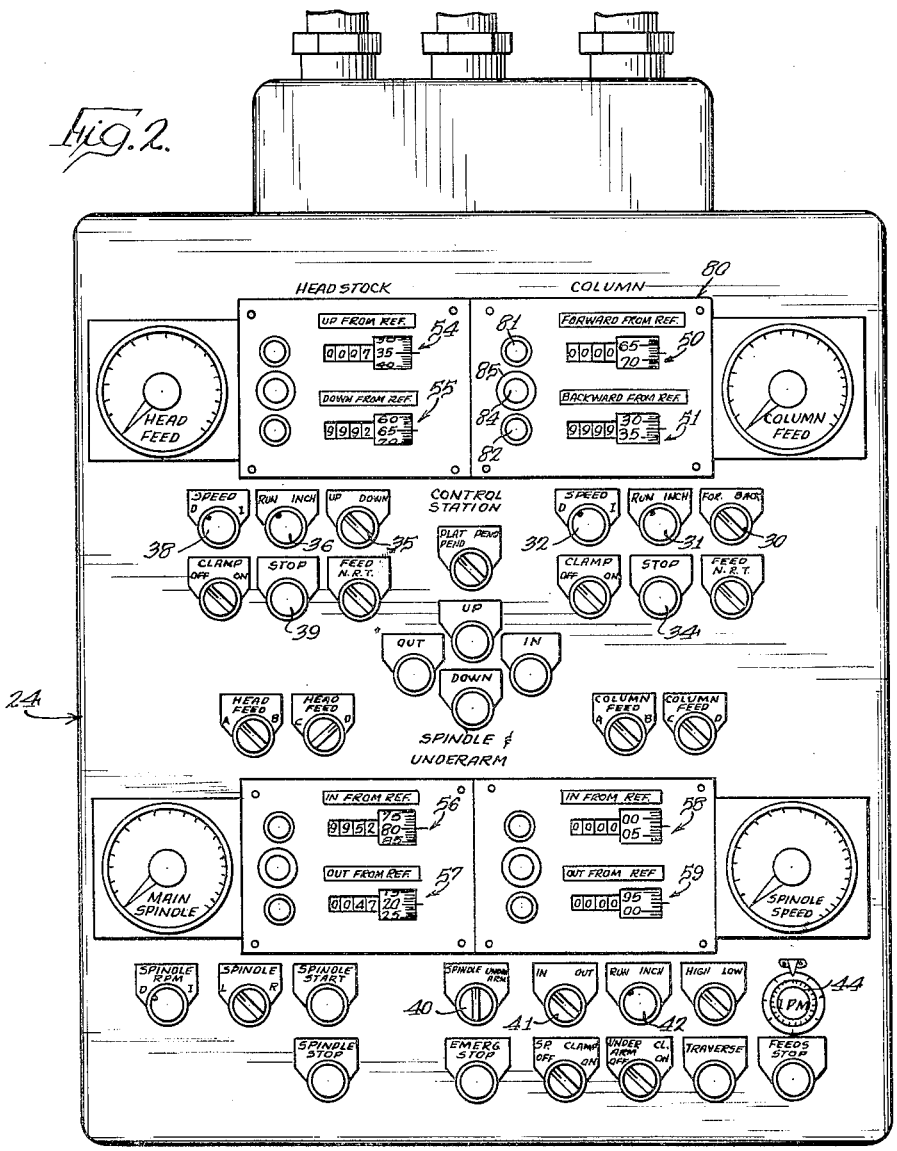
FIG. 2 is an illustration of the face of a control pendant associated with the machine tool.

Referring to FIG. 2, the various control instrumentalities disposed on the pendant 24 are there shown in greater detail. Only those employed specifically for positioning the movable elements will be described. To move the column 16 forwardly or backwardly along the base 18, the operator sets a rotatable knob 30 to the "forward" or "backward" position and then momentarily depresses a pushbutton 31 to energize the column traversing motor. The speed at which the column moves may be adjusted by rotationally setting a knob 32. Movement of the column may be terminated by momentarily depressing a stop button 34.

To effect movements of the headstock 19 upwardly or downwardly relative to the column 16, the operator first sets a rotatable knob 35 to the "up" or the "down" position. He then momentarily depresses a pushbutton 36 to energize the headstock traversing motor. The speed with which the headstock moves may be adjusted by rotationally setting a knob 38, and the motion terminated by momentarily depressing a stop pushbutton 39.

To move either the spindle 20 or the underarm 22 inwardly or outwardly relative to the headstock 19, the operator first positions a rotatable knob 40 to select which of the two elements are to be traversed. He then positions a second rotatable knob 41 to determine whether the movement will be in the inward or outward direction, and initiates such movement by rotating the pushbutton 42 to the "run" position and momentarily depressing the pushbutton 42.

In each instance, after the movable element has been brought almost to the desired position, the pushbuttons 31, 36 and 42 may be rotated to an "inch" position. Then momentary depressions of these pushbuttons will cause the corresponding elements to be moved in small increments until they are in exactly the desired positions.

In accordance with one feature of the invention, the positions of the several movable elements of the machine tool 15 are numerically displayed at a location remote from them, and specifically on the pendant 24 which the operator may take with him in moving about the machine. As shown in FIG. 2, a first decade dial indicator 50 is provided to read directionally the distance which the column has moved forwardly from a reference position, while a similar indicator 51 reads directly the distance which the column has moved backwardly from a reference position. Since, as will appear more fully below, the two indicators 50, 51 are driven in opposite directions as the column 18 moves in opposite directions, the provision of dial indicators 50 and 51 makes it possible for the operator to read directly the displacement of the column from the reference. If only one numerical indicator were employed and the column moved backwardly from a reference position at which that indicator read zero distance, then the indicator would scale backwardly and display the complement of the distance which is traversed. The need for performing a mental subtraction in order to find the complement of the number displayed by a backwardly driven numerical indicator is obviated in this instance by providing two indicators one of which always give a direct reading.

It will be evident from FIG. 2 that a similar pair of numerical indicator devices 54, 55 are mounted in the pendant 24 to display the upward and downward displacements of the headstock 19 from a reference position. Similarly, numerical indicators 56, 57 are mounted in the pendant 24 to display the distance which the spindle 20 has moved inwardly or outwardly from a reference position. Two numerical indicators 58 and 59 perform this same function for the underarm 22.

Because the remote position indicating system for each of the movable elements, i.e., the column 16, the headstock 19, the spindle 20 and the underarm 22, may all be substantially identical, a detailed description of one will suffice for all. Accordingly, the manner in which the numerical indicators 50 and 51 are controlled to display the position of the column 16 relative to a reference position along the base 18 will now be treated in detail.

*The Position Pick-Up Unit*

In carrying out the present invention, a position pick-up unit 60 (FIG. 3) is associated with the column 16 to provide an electric signal which changes in a sense corresponding to the direction, and by an amount proportional to the extent, of the movements of the column. For this purpose, an electric transmitter device 61 is connected to be driven in response to movements of the column.

Figure 3:
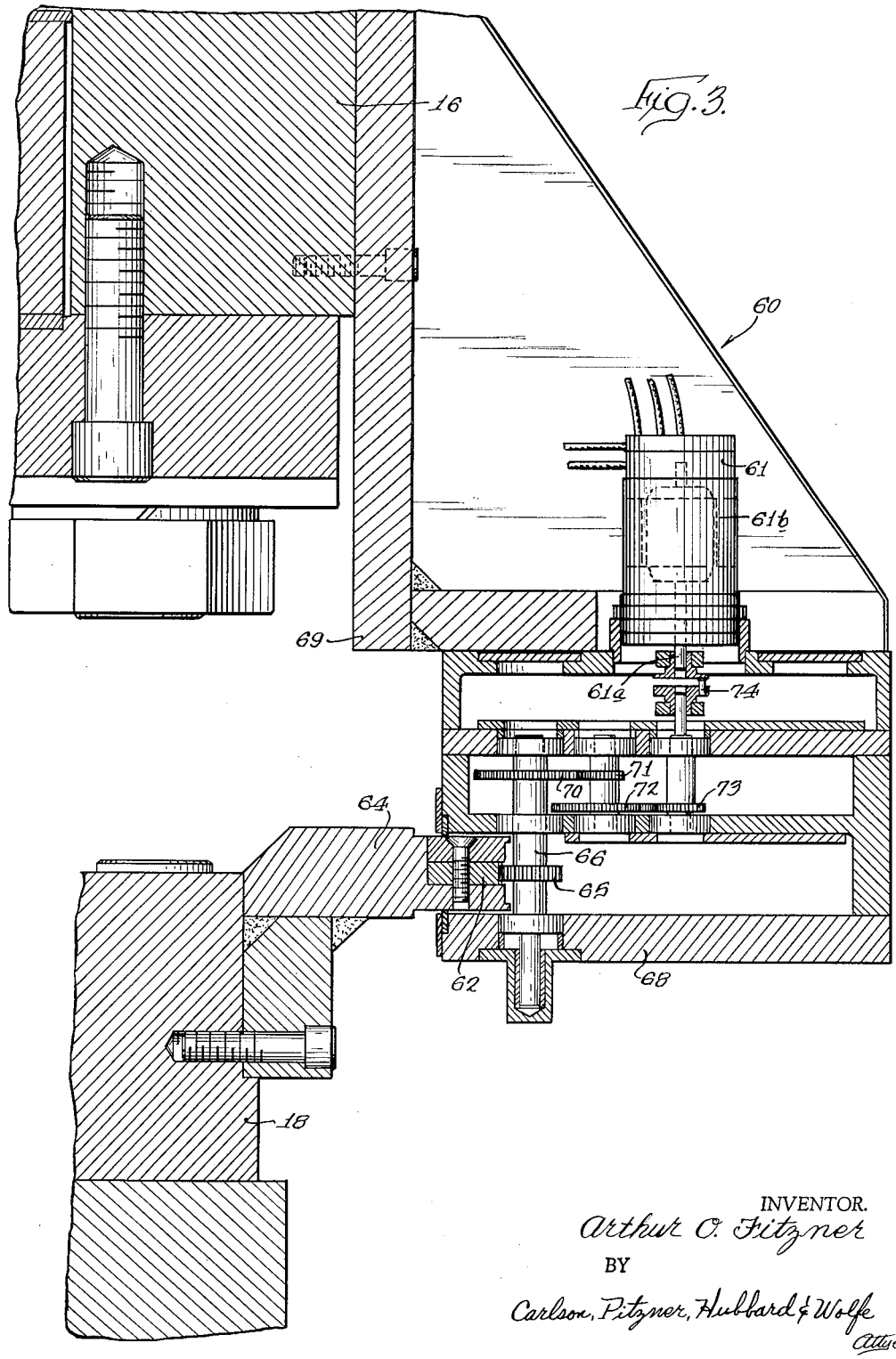
FIG. 3 is a vertical cross section of a position pick-up unit.

As illustrated in FIG. 3, the pick-up unit 60 comprises an elongated precision rack 62 rigidly fixed to a bracket 64 bolted to and extending lengthwise of the machine base 18. Meshed with the rack 62 is a pick-up pinion 65 integral with a shaft 66 journaled in a housing 68 carried by a bracket 69 bolted to the column 16. As the shaft 66 is rotated in opposite directions, it drives the shaft 61a carrying a rotor 61b of the transmitter device 61 through the mating gears 70, 71, 72, 73 and through a coupling 74. All of the gears in the position pick-up unit 60 are preferably precisely cut so that the rotor 61b is turned in one direction or the other depending upon whether the column 16 moves forwardly or backwardly relative to the base 18, and by an amount which is precisely proportional to the extent of that movement. By way of example, the gearing in the pick-up unit 60 may be so sized that the rotor 61b makes one revolution for each ½ inch that the column 16 moves relative to the base 18.

It will be apparent that a variety of drive arrangements other than the specific one illustrated in FIG. 3 may be employed to drive the transmitter device in accordance with movements of the column 16.

In the present instance, the transmitter device 61 is of the well known "self-synchronous" type having, as shown in FIG. 12, a winding 61c on its rotor, and having a three-phase winding 61d carried by its stator. The rotor winding 61c is excited with a single phase A.C. reference signal which may be taken from conventional 115 volt A.C. power lines 76. As the rotor 61c turns in response to movements of the column 16, the amplitude of the voltages induced in the stator windings 61d is correspondingly changed.

*The Read-Out Unit*

Mounted in the pendant 24, and including the numerical indicators 50 and 51 as parts thereof, is a read-out unit 80. Provision is made within this unit to change the numerical readings of the indicators 50 and 51 in one direction or the other and by amounts corresponding to the direction and magnitude of the displacements of the column 16 along the base 18.

Referring first to FIGS. 4 and 6, the numerical indicator 50 is of the plural wheel decade type, having a first rotatable wheel 50a of relatively large diameter and inscribed to display opposite an index mark 50b the position of the column in hundredths and thousandths of an inch.

That is, the wheel 50a is divided into one-hundred equal divisions and is rotationally driven (as hereinafter described) through one revolution for each one-tenth of an inch of column movement. The wheel 50a is connected by 10:1 reduction ratio intermittent gearing (not shown) to drive a second wheel 50c divided into ten circumferential segments and inscribed with numerals to display digits of the one-tenth inch order. In like manner, additional decade wheels 50d, 50e, and 50f are connected in tandem by intermittent reduction gearing from the wheel 50c so that they are rotationally driven to numerically represent decimal distances of units, tens and hundreds orders, respectively.

The second numerical indicator 51 is identical to the indicator 50, and has five tandemly connected numerically inscribed wheels 51a, 51c, 51d, 51e, and 51f.

It will be seen from FIGS. 2 and 4 that the read-out unit 80 also has on its face two pushbuttons 81 and 82 disposed laterally opposite the indicators 50 and 51. These pushbuttons are utilized to control switches for setting the initial readings or reference positions, as will be explained more fully below. Also extending from the first of the read-out units 80 are a pair of concentric rotatable knobs 84 and 85 which, as will be explained more fully, are utilized to manually effect fine adjustments in the initial readings of the indicators, i.e., the reference positions from which they measure distances.

The internal components and details of the read-out unit 80 are more fully illustrated in FIGS. 5–8. First, an electric receiver device 90 having a journaled shaft 90a supporting a rotor 90b is mounted in the lower rear portion of the read-out unit as shown in FIGS. 5 and 7. It is electrically connected with the transmitter device 61 and constitutes with the latter means for producing an error signal agreeable in sense and proportional in magnitude to the relative angular mis-match of the transmitter and receiver rotors 61b and 90b. As illustrated in FIG. 12, the receiver 90 is also of the "self-synchronous" type to cooperate with the synchronous transmitter 61. It has three-phase stator windings 90d which are electrically connected with the stator windings of the transmitter by conductors 91 running through one of the cables 25 (FIG. 1). The receiver 90 also has a rotor winding 90c inductively related to the stator windings.

When synchro transmitter and receiving devices such as the devices 61 and 90 have their three-phase stator windings interconnected as shown in FIG. 12, and the rotor winding 61c of the transmitter is excited with an A.C. reference signal, then a single phase A.C. error signal will be induced in the winding 90c of the receiver rotor. That error signal will be substantially zero, i.e. have zero amplitude, when the two rotors 61b and 90b are matched in their angular positions relative to their corresponding stators. As the rotors are turned relative to one another, the amplitude of the A.C. error signal increases in proportion to the sine of the relative angular mismatch. Because the angular mismatch is not permitted to become very great, it may be considered that the amplitude of the error signal is substantially proportional to the magnitude of angular mismatch. Moreover, except for slight phase shifts arising from the fact that there is not theoretically perfect transformer coupling between the rotor and stator windings, the A.C. error voltage induced in the receiver winding 90c will be either in phase with the reference signal at the lines 76, or of opposite phase (180°), depending upon the direction of angular displacement of the rotor 61b relative to the rotor 90b.

The read-out unit 80 also comprises, as shown in FIGS. 5 and 6, a reversible electric motor 95 having a rotor 95a mounted on a shaft 95d. While the motor may take a variety of forms, it is here illustrated in FIG. 12 as a two-phase induction motor having a first field winding 95b and a second field winding 95c. It will be understood that the rotor of the motor turns in a direction depending upon whether the phase of the alternating voltage applied to its second winding 95c includes a quadrature component lagging or leading the A.C. voltage applied to its first winding 95b. Moreover, for a given amplitude of alternating voltage supplied to the first winding 95b, the speed of the motor 95 is substantially proportional to the magnitude of the quadrature component of the alternating voltage supplied to the second field winding 95c.

In keeping with the invention, means are provided to receive the error voltage appearing in the winding 90c of the receiver rotor 90b and to cause the motor 95 to run in one direction or the other depending upon the direction of relative angular mis-match of the rotors 61b, 90b, and at a speed substantially proportional to the magnitude of that angular mis-match. Such means for controlling the motor 95 in response to the error signal induced in the receiver 90 are exemplified by the circuit components shown in FIG. 12, and these will be described in greater detail below. It is sufficient to note at this time only that when there is angular disagreement between the transmitter and receiver rotors 61b and 90b, the motor 95 will be energized to run in one direction or the other, according to the sense of that relative angular disagreement.

To cause the motor 95 to rotate in a direction agreeing in sense with the direction of movement of the column 16 along the base 18 (FIG. 1) and through angles which are proportional in magnitude to the displacements of the column 16 relative to the base, a drive connection is established from the motor rotor 95a to the receiver rotor 90b. This drive connection is such that the motor when energized re-adjusts the angular position of the receiver rotor 90b to reduce the error signal to zero, i.e., to reduce the receiver output voltage from winding 90c to zero, and thus reduce the quadrature voltage applied to the motor windings 95c to zero. When the error signal is reduced to zero, the motor is de-energized.

As shown in FIG. 5, this drive connection from the motor 95 to the synchro receiver rotor 90b is provided by a gear train which includes a first gear 100 mounted on the motor shaft 95d and meshing with a second gear 101. Rigid with the gear 101 is a smaller gear 102 which meshes with an idler 104 rigid with a smaller pinion 105. The pinion, in turn, drivingly connects to a large gear 106 which is mounted on the shaft 90a of the receiver rotor 90b.

Thus, whenever the motor runs, it drives the receiver rotor 90b through the gears 100, 101, 102, 104, 105, and 106 to bring the receiver rotor into relative angular agreement with the transmitter rotor 61b. Since when the receiver rotor 90b has been brought into angular agreement with the transmitter rotor 61b the error signal is reduced to zero, the motor 95 is controlled to rotate in a direction corresponding to the direction of movement of the column 16 and through a total angle which is proportional to the magnitude of displacement of the column 16.

To make the two numerical indicators 50 and 51 change their numerical readings upwardly or downwardly according to the direction of column movement, and by an amount which reflects the extent of column movement, drive connections are established from the motor 95 to both of the indicator devices. As shown in FIGS. 5 and 6, the gear 102, which is driven from the motor shaft through gears 100 and 101, meshes with a gear 108 fixed to a shaft 109 carrying the first wheel 50a of the indicator 50. As the motor 95 rotates in directions corresponding to movement of the column forwardly or backwardly along the base 18, the numerical indicator 50 will be driven in a direction to scale upwardly or downwardly. The ratio of the gearing is chosen, for example, such that when the column moves a distance of ½ inch and causes the transmitter rotor 61b to make one revolution, the motor 95 in rotating through an angle necessary to produce one revolution of the receiver rotor 90b will drive the indicator wheel 50a through five revolutions, i.e., corresponding to ½ inch.

As previously explained, if the indicator 50 initially reads zero displacement (000.000), and the column 16 is then moved backwardly along the base, the numerical indicator 50 will scale backwardly from zero, thus reading the complement of the distance through which the column is moved. That is, if the column moves backwardly through ½ inch, the indicator 50 will read "999.500." In order to provide the machine operator with a direct reading of displacements which are either positive or negative from a zero reference, the second numerical indicator 51 is drivingly connected with the motor 90 such that it scales in a forward direction as the column 16 moves backwardly relative to the base. In other words, the drive connection from the motor 95 to the second numerical indicator 51 is of the opposite sense as contrasted with that drive connection from the motor to the first numerical indicator 50.

As illustrated in FIGS. 5 and 7, this drive connection from the motor shaft 95d includes the gears 100, 101, 102 as well as the idler gear 104 which meshes with a gear 110 fixed to a shaft 111 supporting the wheel 51a of the indicator 51. Thus, whenever the motor is energized and the first indicator 50 scales in one direction, the second indicator 51 will scale in the opposite direction. The ratios of the gear drives from the motor to the two indicators are made identical.

*Sign or Direction Display*

With the two numerical distance indicators 50 and 51 driven in opposite senses by the motor 95, it is possible that the operator might sometimes be uncertain as to which one gives the true reading. For example, if the column 16 has been moved 545.555 inches forwardly from a reference position, the indicator 50 will display the number "545.555," while the indicator 51 (having been driven reversely) will display the complementary number "454.445." The operator might not be certain as to which indicator he should read, i.e., whether the column had been moved forwardly or backwardly from the reference position.

In accordance with an important feature of this invention, the foregoing difficulty is obviated by the provision of means for automatically displaying the sign of the displacement of the movable machine tool element from a reference position. In other words, means are provided to indicate at a glance which of the two numerical indicators gives a true reading and should be read in order to ascertain the position of the machine tool element.

For this purpose, a display device is associated with each of the numerical indicators 50 and 51, such display devices here taking the form of pilot lamps 200 and 201 disposed within the translucent pushbuttons 81 and 82 opposite the numerical indicators 50 and 51 (FIGS. 4, 6 and 7). Means are provided for normally actuating or energizing each of these display devices or pilot lamps, and for de-actuating or de-energizing each such lamp when its corresponding indicator has scaled backwardly from a zero reading.

As here shown in FIGS. 7 and 11, a switch 204 is disposed opposite the hundreds order wheel 51f of the numerical indicator 51, and includes a toggle lever 204a for opening and closing that switch as it is thrown between two positions (to the left or the right as viewed in FIG. 11). For engaging and shifting the toggle lever 204a, a pin 205 is carried by the hundreds order wheel 51f, the toggle lever and pin being so disposed that as the wheel 51f turns backwardly (counterclockwise in FIG. 11) from a position in which to display the digit "zero" the pin will engage and shift the toggle lever to a position which causes opening of the switch 204. Thereafter, the pin 205 can continue to turn with the wheel 51f in a backward direction, but it will never make one complete revolution since the maximum distance traversable by the column 16 is less than one thousand inches. When the column is again moved back towards the reference position and ultimately reaches the reference position so that the numerical indicator 51 again reads "zero," the pin 205 will engage the toggle lever 204a and shift the latter to close the switch 204.

The switch 204 is connected in series with the pilot lamp 201 across suitable voltage supply lines (FIG. 12) so that the pilot lamp will be lighted whenever the numerical indicator 51 reads "zero" or scales positively from a zero reading. The lamp 201 will be de-energized when the indicator 51 scales backwardly from a zero reading.

As shown in FIG. 6, the numerical indicator 50 has a switch 206 disposed adjacent to the hundreds order wheel 50f, and includes a toggle lever 206a disposed in the path of a pin 208 carried by that wheel. The switch 206 is controlled in the same manner with relation to the movements of the counter wheel 50f as previously described in connection with the switch 204 and the counter wheel 51f. The switch 206 is connected in circuit with the pilot lamp 200 across suitable voltage supply lines as shown in FIG. 12, so that the lamp 200 will be lighted whenever the numerical indicator 50 reads "zero" or scales in a positive direction from a zero reading.

When either of the two numerical indicators scales backwardly from a zero reading so that the hundreds order wheel 50f or 51f turns to read "9" and successively smaller digits, then the pins with those wheels will shift the switch levers 204a or 206a, and open the corresponding switch, thus de-energizing the associated pilot lamp.

By this provision, therefore, the operator of the machine tool need never be puzzled over which of the numerical indicators 50 or 51 he should read. He need only observe which of the two pilot lamps 200 or 201 is lighted, and read the numerical indicator which is opposite that lighted lamp.

*The Amplifier Circuit*

Because the column 16 may under some circumstances be abruptly accelerated and traversed at high velocities on the order of 120 inches per minute, special provisions are made to prevent the inertia of the motor 95, the synchro receiver 90 and the two indicators 50 and 51 from causing the receiver rotor to lag the transmitter rotor by more than ½ revolution. If this occurs, the synchro transmitter 60 and receiver 90 might "slip a pole" so that the numerical indicators would then be in error by ½ inch. For this purpose, the error signal induced in the receiver rotor winding 90c is amplified considerably so that the torque of the motor 95 is great enough to accelerate rapidly the masses represented by its own rotor 95a, the synchro receiver rotor 90b, the two indicators 50, 51, and the interconnecting gears.

In addition, provision is made to introduce a damping signal proportional to the speed of the motor 95 so that it does not reach such a high speed that it "overshoots" or drives the receiver rotor 90b beyond a position of angular agreement with the transmitter rotor 61b. Still further, provision is made for optionally causing the motor 95 to drive the receiver rotor 90b without regard to the transmitter, thus effecting powered adjustment of the initial or reference readings of the numerical indicators 50 and 51.

As shown in FIG. 12, the A.C. error signal from the rotor winding 90c is applied to a potentiometer 92 which permits amplitude adjustments, and then applied to a phase-shifting network comprising a resistor 115 and a capacitor 116. The voltage across the capacitor 16 slightly lags in phase the error signal induced in the rotor winding 90c. By appropriately choosing the relative values of the resistor 115 and the capacitor 116, the phase lag thus introduced can be made to cancel the slight advance in phase of the error signal relative to the reference signal across the lines 76 which is created by the imperfect transformer coupling in the devices 61 and 90. The voltage across the capacitor 116, therefore, is substantially in phase with the reference signal. This is helpful in algebraically combining the effective error signal with a bucking damping signal, as will be more fully explained below.

The effective error signal across the capacitor 116 is supplied through the resistor 115a to the control electrode 118a of a pentode amplifier 118 which is here employed as a "summing-integrator." That descriptive term is employed because the vacuum tube 118 is arranged to accept two A.C. signals, to algebraically sum them, and to integrate them. Integration in the case of sinusoidal signals results in a phase advance of 90° in the output signal relative to the input signal.

The tube 118 has its cathode 118b connected through a self-biasing resistor-capacitor combination 119 to a point of reference potential here shown as ground. Its anode 118c is connected through a load resistor 120 to a direct voltage source here represented by the conventional symbol B+. To constitute the pentode amplifier 118 as a means for creating a 90° advance between its output signal and the input signal supplied to its control electrode, a large feedback capacitor 121 is connected directly between its anode 118c and its control electrode 118a. With this, the A.C. voltage appearing at the anode 118c in response to an A.C. signal appearing across the capacitor 116 will not only be amplified but will be advanced in phase by substantially 90°.

For further amplifying the error signal, the output of the pentode amplifier 118 is first supplied to a phase inverter circuit 125 which includes two triode vacuum tube devices 126 and 127. It will be seen that the output of the device 118 is supplied from its anode 118c through a capacitor 128 and a resistor 129 to the control electrode 126a of the tube 126. The anode 126b of the latter device is connected through a load resistor 130 to the direct voltage source, while its cathode is connected through a resistor 131 to ground. Therefore, the amplified signals appearing at the anode 126b will be 180° out of phase with the input signals supplied to the control electrode 126a. This signal from the anode 126b is supplied through a capacitor 132 and a resistor 134 to the control electrode 127a of the second tube 127. The latter has its anode 127b connected through a load resistor 135 to the direct voltage source, and its cathode also connected through the resistor 131 to ground. Thus, the output signal appearing at the anode 127b will be shifted substantially 180° in phase relative to the input signal supplied to the control electrode 127a; in other words, the A.C. signal appearing on the anode 127b is in phase with the input signal supplied to the control electrode 126a. Two amplified alternating current signals displaced in phase by 180° thus appear at the anodes 126b and 127b.

These two phase-inverted signals are supplied to control electrodes 140a and 141a of vacuum tube pentode amplifiers 140 and 141, respectively. The cathodes of these latter amplifying tubes are connected through a self-biasing circuit 144 to ground, and their anodes are connected through respectively opposite halves of the center tapped primary winding T1 of a transformer T to the direct voltage source. The amplifier tubes 140 and 141 thus work in push-pull relation and induce an amplified alternating current voltage in a secondary winding T2 of the transformer.

The second field winding 95c of the induction motor 95, being connected across the transformer secondary winding T2, thus receives an amplified alternating voltage which is 90° out of phase with the reference signal supplied to the winding 95b. The voltage on the winding 95c will lead by 90° the effective error signal developed across the capacitor 116 and thus will be either 90° leading or 90° lagging the reference voltage appearing across the supply line 76 and applied to the field winding, depending upon the sense or direction of relative angular mismatch of the synchro rotors 61b and 90b. The motor 95 is thus energized to run in one direction or the other, but always to drive the rotor 90b toward angular agreement with rotor 61b.

It should be observed at this point that under balanced conditions, i.e. when the rotors 90b and 61b agree in angular position, the output voltage from the winding 90c is zero. Thus the amplified voltage applied to the winding 95c of the motor 95 is also zero, and the motor remains stationary.

To prevent overshoot and hunting of the motor 95, damping means are employed. As here shown (FIG. 6), a tachometer generator 150 is drivingly connected with the motor 95, and specifically in this instance, has its rotor 150a mounted on the same shaft as the motor rotor 95a. The rotor of the tachometer will thus be driven in the same direction and at the same speed as the motor 95.

As shown in FIG. 12, the tachometer generator 150 is preferably of the A.C. induction type having a shorted-conductor rotor 150a and first and second field windings 150b, 150c. The first winding 150b is continuously energized with the A.C. reference signal from the supply lines 76. It is characteristic of the induction type generator that an A.C. voltage will be induced in its second field winding 150c which is proportional in amplitude to the speed of the rotor 150a, and which is either very nearly in phase or 180° out of phase with that reference signal supplied to the winding 150b depending upon whether the rotor is turning in one direction or the other.

The A.C. voltage induced in the tachometer winding 150c will not be precisely in phase or 180° out of phase with the reference signal across the supply lines 76, but will lead slightly these phase values due to the fact that the tachometer 150 is not a theoretically perfect device. To permit subtraction (or algebraic addition) of the tachometer output voltage from the effective error voltage appearing across the capacitor 116, the former voltage is phase shifted to be 180° out of phase with the latter voltage. For this purpose, the tachometer signal is passed first through a potentiometer 154 to permit adjustment in the degree of damping action, and then supplied from the wiper 154a to a phase shifting network including resistor 152 and a capacitor 153. The signal appearing across the capacitor 153 lags the tachometer signal induced in the winding 150c, and is almost exactly 180° out of phase with the effective error signal appearing across the capacitor 116. Since both of these signals are supplied to the control electrode 118a (through resistors 115a and 151, respectively) and the grid return resistance made up by a resistor 157 and the effective portion of a rheostat 162, they will algebraically combine because they are opposed in phase.

As the motor 95 turns, therefore, the amplitude of the effective tachometer voltage appearing across the capacitor 153 will be proportional to its speed, and the phase of that voltage will depend upon the direction of rotation. This effective tachometer voltage is subtracted from the error signal to correspondingly reduce the magnitude of the quadrature voltage supplied to the motor winding 95c. Thus, a damping action is obtained which prevents the speed of the motor 95 from increasing to extreme velocities which might result in overshoot or hunting.

For further increasing the stability of the system, and particularly to compensate for variations in the characteristics of the vacuum tubes 126, 127, 140 and 141, negative feedback means may be employed in the amplifier circuit. As here shown, the center of the transformer secondary winding T2 is grounded, and a feedback conductor 155 leads through a phase correcting circuit, made up of a resistor 156 and a parallel capacitor 157, to a resistor 158 in the control grid circuit for the tube 126. By adjusting the resistor 156, a 180° phase relation of the feedback signal relative to the input signal applied to the control electrode 126a is obtained. Thus, the feedback signal applied to the control electrode 126a subtracts from the input signal, and holds the over-all gain of the vacuum tubes 126, 127, 140 and 141 substantially constant.

Adjustments of Reference Readings

In the operation of the machine tool, it is often desirable to change the reference positions from which displacements are numerically indicated by the devices 50 and 51. For example, if a hole is being drilled by the spindle 20 at one location in the workpiece, and another hole is to be drilled at a position displaced horizontally along the base a predetermined distance from the first, the operator may desire to set the indicator wheels to a zero reading when the column is in the first position. Then, all he need do is cause the column 16 to move in the desired direction until the appropriate one of indicator devices 50 and 51 reads directly the numerical value of the distance to be established between the two drilled holes.

In order to enable the operator to reset the numerical readings of the indicators 50 and 51 to any value at any time, and independently of the position of the column 16, power means are employed. Because the shafts supporting the first decade wheels 50a and 51a of the indicator devices must be turned through so many revolutions in order to change the numerical reading by a few inches, such power means for effecting this rotation enables resetting with a minimum of time and inconvenience.

In keeping with one feature of the invention, provision is made not only to reset the indicator devices to any desired reading by power means, but the same motor employed for driving the indicators when the machine tool element moves is utilized for this purpose.

To increase the readings of the first indicator 50 and correspondingly decrease the reading of the indicator 51, the operator depresses the pushbutton 81 opposite the first indicator. This closes a normally open switch SF (FIG. 6) which has contacts SF1 and SF2 shown in FIG. 12. Alternatively, if the operator desires to drive the indicator device 50 in a reverse direction so as to decrease its numerical reading and correspondingly increase the numerical reading of the indicator 51, he depresses the pushbutton 82 (FIG. 7) which results in actuation of a switch SR having contacts SR1 and SR2 shown in FIG. 12.

The actuation of either the switch SF or SR results in energization of coils F or R, respectively, which are connected in series with the contacts SF1 and SR1 across the voltage supply lines 76 (FIG. 12). Pick-up of either the relay coils F or R results in closure of the contacts F1 or R1 which are respectively controlled by those coils, such contacts being connected to shunt the error signal appearing at the resistor 92 to ground thereby effectively disconnecting the motor 95 from the synchro receiver 90. Further, pick-up of either the relay coils F or R results in closure of the corresponding contacts F2 or R2 which are respectively controlled by those coils, such contacts being connected through resistors to the opposite extremities of a center tapped secondary winding 160 of a transformer having a primary winding 161 energized from the A.C. supply line 76. The contacts F2 and R2 both lead from the secondary winding 160 (which has its center tap grounded) through a resistor 162 to ground, so that the A.C. voltage appearing on a wiper 162a adjustable along that resistor is either in phase with or 180° out of phase with the A.C. reference signal appearing across the line 76. The voltage appearing on the wiper 162a is supplied to the control electrode 118a of the phase shifting tube 118, so that the output of that tube either lags or leads by 90 degrees the A.C. reference signal, depending upon whether the contacts F2 or the contacts R2 are closed. The output signal appearing at the anode of the phase shifting tube 118 is inverted by the circuit 125 and amplified by the push-pull tubes 140, 141, being thence applied to the second field winding 95c of the motor 95. It will be apparent, therefore, that depending upon which of the pushbuttons 81 or 82 is depressed, and which of the relays F or R is energized, a voltage lagging or leading by 90° the reference voltage applied to the field winding 95b will be applied to the field winding 95c causing the motor 95 to rotate in one direction or the other. The motor will accordingly drive the wheels of the indicator devices 50 and 51 in opposite directions to change the numerical readings thereof.

Again, in this mode of operation the tachometer 150 will be driven by the motor 95 and will generate a damping signal which is subtracted from the "artificial error" signal appearing across the resistor 162. Thus, the speed of the motor 95 when it is employed to reset the numerical readings of the indicator devices may be adjusted by setting the wiper 162a.

The reason for causing the vacuum tube device 118 to create a 90° phase shift between input signals applied to the various input resistors 115a, 151, and 157 and output signals appearing at its anode 118c will now be clear. First, the error signal induced in the receiver winding is always very nearly, but not quite, either in phase or 180° out of phase with the reference signal appearing across the lines 76. If that error signal were simply amplified and supplied to the motor winding 95c, it would have substantially no quadrature phase component relative to the reference voltage applied to the other motor winding 95a. The motor would thus not vigorously respond to the error signal. Secondly, the damping signals induced in the tachometer winding 150c are always very nearly, but not quite, either in phase or 180° out of phase with the reference signal on the supply lines 76. If these damping signals were simply amplified and applied directly to the motor field winding 95c without the phase shift introduced by the tube 118, they would have substantially no quadrature component relative to the reference voltage applied to the motor winding 95b, and thus could not create a damping effect on the motor 95. Likewise, the artificial error signals (derived from the transformer 160, 161 and appearing across the resistor 162 when the contacts F2 or R2 are closed) are either in phase or 180° out of phase with the reference signal appearing on the lines 76 and applied to the motor field winding 95b. Without a phase shift, such as that caused by the tube 118, these signals would not cause a quadrature component in the A.C. voltage applied to the field winding 95c, and the motor rotor would not be driven. By bringing the effective error signal across the capacitor 116 into in- or out-of-phase relation with the reference signal, and bringing the effective tachometer signal across the capacitor 153 into in- or out-of-phase relation with the reference signal, the two can be directly combined by application to the control electrode 118a. The 90° phase shift caused by the tube 118 as a result of the feedback capacitor 121 then makes the net signal applied to the motor winding 95c lag or lead by 90° the reference signal supplied to the other motor winding 95b. Likewise when powered adjustment of reference readings are made, the "artificial error" signal from the transformer 160, 161 and the effective damping signal from the capacitor 153 can be directly combined.

Fine Adjustments of Indicator Readings

Whenever the pushbuttons 81 or 82 are depressed to cause the motor 95 to drive the numerical indicators 50 and 51 independently of the synchro receiver 90, the numbered wheels 50a, 50c, and 51a, will, upon release of the pushbutton, be driven in one direction or another until the synchro receiver rotor 90b is angularly matched to the synchro transmitter rotor 61b. In other words, the powered adjustment of the numerical readings may only set the indicators 50, 51 to within the nearest ½ inch of the desired reading since upon release of the adjustment pushbuttons the motor 95 will again be placed under the control of error signals created in the receiver rotor 90b.

To afford accurate setting of the numerical indicators precisely to a zero reading, or to any desired numerical reading accurate to the nearest thousandths of an inch, a manual adjustment is provided which avoids the need for any disengageable drive couplings or clutches. In accordance with this feature of the invention, the stator 90g of the synchro receiver 90 is made rotationally positionable, and means are provided to set it at any desired angular position. This changes the angular position of the receiver rotor 90b relative to the stator 90g, so that an error signal appears to energize the motor 95 and cause the receiver rotor to follow the angular adjustment of the receiver stator. And this simultaneously causes changes in the readings displayed by the numerical indicators 50 and 51.

As shown best in FIGS. 7 and 8, the synchro receiver 90 comprises a housing 90e having a flange 90f rigidly clamped beneath a bracket 170. The stator 90g is jounaled in and rotatable relative to the housing 90e, and carries a gear 171 meshed with a pinion 172 fixed on a shaft 173 connected by bevel gears 174, 175 with a shaft 176. The latter shaft is connected through a two ratio planetary mechanism 178 to the concentric knobs 84 and 85. The rotor 90b, and its shaft 90a which carries the gear 106, are journaled in the stator 90g. Connections to the stator and rotor windings are brought out through slip rings, not shown.

To hold the synchro stator 90g stationary under normal operating conditions, yieldable brake means are employed. As here shown, the shaft 173 carries a collar 179 closely spaced to a stationary bracket 180 which journals the left end of the shaft 173 (FIG. 8). Clamped between the end of the collar 179 and the bracket 180 is a friction member here shown as a resilient O-ring 181 made of synthetic rubber or the like. Thus, the shaft 173 is prevented from rotating by the frictional braking action of the O-ring 181 under normal circumstances, and the gear 172 in engaging the gear 171 prevents the receiver stator 90g from turning as the receiver rotor rotates.

To permit the operator manually to adjust the angular position of the synchro receiver stator 90g, the innermost knob 84 is fixed to the shaft 185 (FIG. 9), and the outermost knob 85 is fixed to a sleeve 186 concentrically and rotatably surrounding that shaft. The shaft 185 and the sleeve 186 form two input members (a "sun" member and a "carrier" member) for the planetary mechanism 178 and serve to drive the output shaft 176 of that mechanism respectively at a reduced ratio or with a direct 1:1 ratio, respectively.

The planetary mechanism 178 comprises a stationary housing 187 mounting a pair of stationary friction members such as brass rings 188 which surround and contact the peripheries of a plurality of balls 189 ("planet" members). These balls are disposed within a plurality of fingers 186a formed in the midportion of the sleeve 186. That sleeve extends further for rigid connection to the shaft 176. The balls 189 also frictionally engage the surface of a groove 185a formed in the shaft 185.

As a result of this construction, when the knob 84 and the shaft 185 are manually turned, the engagement of the surface of the groove 185a with the balls 189 will cause the latter to roll around rings 188. This planetary action of the balls thus drives the fingers 186a, the sleeve 186, and the shaft 176 with a speed and distance step-down. The shaft 176, the bevel gears 174, 175, and the shaft 173 will turn the pinion 172 which then drives the gear 71 and the synchro receiver stator 90g. Because of the step-down reduction, e.g. on the order of 5:1, created by the differential mechanism between the knob 84 and the shaft 176, very fine, precise adjustments of the synchro stator position can be made. Accordingly, the numerical indicators 50 and 51 can be adjusted to display a reading accurate to the nearest thousandths of an inch.

On the other hand, when manual adjustments of the indicator readings through a considerable numerical range are required, the "coarse" adjustment knob 85 is manually turned to rotate the sleeve 186. This causes the shaft 176 to rotate in unison with the knob 85, since the two are directly connected by the sleeve 186. This direct drive between the knob 85 and the shaft 176 causes the shaft 173, the pinion 172, and the gear 171 to be rotated rapidly through greater distances to effect coarse adjustments in the angular position of the synchro receiver stator 90g.

Whenever either the fine adjustment knob 84 or the coarse adjustment knob 85 is turned, and the angular position of the synchro stator correspondingly changed, a mis-match between the angular positions of the transmitter rotor 61b and the receiver rotor 90b (relative to their stators) is created. This, as previously explained, results in energization of the motor 95 which then drives the synchro receiver rotor 90b until that mis-match is reduced to zero. Thus, as the knobs 84 or 85 are turned to rotate the receiver stator 90g, the motor 95 causes the synchro rotor 90b to follow the stator. Moreover, this rotation of the motor 95 results in rotational drive to the two numerical display devices 50 and 51, as previously explained, so that the readings of the decade dials in those indicators are correspondingly changed. By this arrangement, therefore, the operator may make rapid and precise adjustments in the reference readings of the numerical indicators, after he has employed the power drive means previously described to change those numerical readings by relatively large amounts.

It will be observed that when the knobs 84 and 85 are turned, the shaft 173 is rotated against the frictional retardation of the O ring 181 (FIG. 8); but when the apparatus is operating under normal circumstances and the synchro receiver rotor 90b is being driven by the motor, the O ring 81 prevents rotation of the receiver stator 90g.

*Résumé of Operation*

It is believed that the operation and advantages of the present remote indicator system will be apparent from the foregoing detailed description. However, a brief résumé will be helpful.

When the operator of the machine tool (FIG. 1) desires to change the position of the column 16 along the base 18, he first rotationally sets the knob 30 on the pendant 24 (FIG. 2) in order to select the direction of column movement. He then depresses the pushbutton 31 which initiates movement of the column, and terminates such movement by depressing the stop pushbutton 34.

While the column is moving, or between inching or jogging motions imparted to it, the operator can observe the distance which it has traversed by reading one of the numerical indicators 50 or 51 which are disposed in the pendant 24 and which are thus always directly in front of the operator as he moves about the machine.

Because the two indicators 50 and 51 are driven in opposite senses as the column is moved in either direction, one of those indicators always gives a direct reading of the distance the column has been moved from a reference position. Mental subtraction is eliminated. In order that the operator will always be immediately apprised as to which of the two indicators gives this direct reading, the pilot lamps 200, 201 within the translucent pushbuttons 81, 82 (FIG. 4) are so controlled that the particular lamp associated with the positively reading indicator will be lighted.

The operator can quickly and conveniently change the reference position from which the indicators 50 and 51 read numerical distances. He can change the readings of both indicators rapidly in either sense by depressing the pushbutton 81 or 82. This, as previously explained, removes the driving motor 95 from the control of the synchro receiver 90, and supplies an artificial error signal which results in rotation of that same motor in one direction or the other depending upon which of the pushbuttons 81 or 82 is depressed.

After such a power adjustment of the indicator readings has been made, release of the pushbutons 81 or 82 again places the motor 95 under the control of the synchro transmitter 61 and receiver 90. The indicators may thus not display to the nearest thousandths of an inch the desired reference reading. In order to set the indicators exactly to the desired reading, the operator first turns the coarse adjustment knob 85 and then the fine adjustment knob 84. This causes angular adjustments of the synchro receiver stator 90g. The error signals created by such rotational positioning of the receiver stator results in the motor 95 being energized to drive the indicators precisely to the desired numerical readings.

The present system is characterized by its ability to keep the readings of the numerical indicators precisely in step with the distances traversed by the column, even though the latter is abruptly accelerated and moved at high velocities on the order of 120 inches per minute. Moreover, it is of great convenience to the machine operator to have the position of a movable machine tool element numerically displayed before him as he moves about the machine with the pendant 24, and governs the positions of the machine elements by actuating the control instrumentalities on the pendant.

I claim as my invention:

1. In apparatus for indicating the position of a machine tool element movable in opposite directions, the combination comprising a reversible motor, means for causing said motor to rotate in a direction and by an amount corresponding to movements of said tool elements, two substantially identical numerical indicators which both read "zero" when the tool element is in a reference position, drive connections of opposite sense from said motor to respective ones of said indicators, so that as the tool element moves either in a positive or negative direction from the reference position one indicator scales forwardly and the other scales backwardly, whereby one of said indicators always provides a direct numerical display of the distance of the tool element from the reference position.

2. In apparatus for indicating the position of a machine tool element movable in opposite directions, the combination comprising a reversible motor, means for causing said motor to rotate in a direction and by an amount proportional to movements of said tool element, two numerical indicators which both read "zero" when the tool element is in a reference position, drive connections of opposite sense from said motor to respective ones of said indicators so that as the tool element moves either positively or negatively from the reference position one indicator scales backwardly and the other scales forwardly, a display device associated with each said indicator, and means for causing each of said display devices to indicate when its corresponding indicator has scaled forwardly from a zero reading.

3. In apparatus for indicating the position of a translatable element movable in opposite directions, the combination comprising a reversible motor, means for energizing said motor to rotate in a direction and by an amount corresponding respectively to the sense and extent of movement of said translatable element, two decade wheel numerical indicators, gearing connections of opposite sense from said motor to respective ones of said indicators, a pilot lamp for each indicator, means including a switch associated with each lamp for energizing the same, and means for closing and opening each switch when the corresponding indicator turns forwardly or backwardly through a zero indication, so that the direct reading indicator is marked by an energized pilot lamp.

4. In apparatus for indicating at a remote location the position of an element movable in opposite directions, the combination comprising, a reversible motor, two numerical indicators which both read "zero" when the element is in a reference position, drive connections of opposite sense from said motor to respective ones of said indicators, means for producing an error signal responsive to displacement between the position of said elment and the readings of said indicators, control means connected to operate said motor in accordance with said error signal to drive said numerical indicators to reduce said error signal to null so that one of said indicators provides a direct numerical display of the distance of the element from the reference position, and means for setting said indicators to a desired reading independently of the position of said element for reference resetting, said reference resetting means including means for disconnecting said error signal from said control means and for selectively operating said motor via said control means in either direction to drive said indicators simultaneously to the desired reading.

5. In an apparatus for indicating at a remote location the position of an element movable in opposite directions, the combination comprising, a reversible motor, two numerical indicators which both read "zero" when the element is in a reference position, drive connections of opposite sense from said motor to respective ones of said indicators, means for producing an error signal responsive to displacement between the position of said element and the readings of said indicators, control means connected to operate said motor in accordance with said error signal to drive said numerical indicators to reduce said error signal to null so that one of said indicators provides a direct numerical display of the distance of the element from the reference position, and means for simultaneously setting both said indicators to a desired reading independently of the position of said element for reference resetting, said reference resetting means including means for disconnecting said error signal from said control means, means connected to said control means for producing an artificial error signal of a sense and magnitude to drive said indicators via said control means and motor toward a desired indicator reading, and means included in said control means for producing a dampening signal and combining the latter with said artificial error signal to prevent overshoot of said indicators beyond the desired reading.

6. In apparatus for indicating at a remote location the position of an element movable in opposite directions, the combination comprising, a reversible motor, two numerical indicators which both read "zero" when the element is in a reference position, drive connections of opposite sense from said motor to respective ones of said indicators, means including a synchro system for producing an error signal responsive to a difference between the position of said element and the readings of said indicators, said synchro system including a synchro with rotor mechanically connected to said indicators and having included therein the error signal, control means receiving said error signal from said synchro rotor and connected to operate said motor to drive said numerical indicators to reduce said error signal to null so that one of said indicators provides a direct numerical display of the distance of the tool element from the reference position, and means for setting said indicators to a desired reading independently of the position of said element for reference resetting, said reference resetting means including means for disconnecting said rotor from said control means and for selectively operating said motor via said control means in either direction to drive said indicators toward the desired reading, and means providing a fine adjustment of the indicators including means for manually rotating the stator of said second synchro thereby causing the rotor thereof to follow and drive said indicators simultaneously to precisely the desired reading.

7. In apparatus for indicating a remote location the position of an element movable in opposite directions, the combination comprising, a reversible two-phase induction motor having first and second field windings, two numerical indicators which both read "zero" when the element is in a reference position, means connecting said first field winding to an alternating current reference signal, means for producing an alternating current error signal responsive to a difference between the position of said element and the indicators readings, said error signal being in or out of phase relative to said reference signal according to the direction of said difference and being proportional in amplitude to the magnitude of said difference, control means receiving said error signal including means for amplifying and shifting said error signal 90° in phase and applying it to said second field winding so as to operate said motor in a direction to drive said numerical indicators to reduce said error signal to null so that one of said indicators provides a direct numerical display of the distance of the element from the reference position, and means for setting said indicators to a desired reading independently of the position of the element for reference resetting.

8. In apparatus for indicating at a remote location the position of an element movable in opposite directions, the combination comprising, a reversible motor, two numerical indicators which both read "zero" when the element is in a reference position, drive connections of opposite sense from said motor to respective ones of said indicators so that upon movement of said motor in either direction one of said indicators adds and the other subtracts from its reading, means for producing an error signal responsive to displacement between the position of said element and the readings of said indicators, control means connected to operate said motor in accordance with said error signal to drive said numerical indicators to reduce said error signal to null so that one of said indicators provides a direct numerical display of the distance of the element from the reference position, and means for simultaneously driving said indicators in either direction to a desired reading independently of the position of said element for reference resetting.

9. In apparatus for indicating at a remote location the position of a machine tool element movable in opposite directions, the combination comprising, a reversible motor, a numerical indicator driven by said motor, means for producing an alternating current error signal having one phase or a second phase displaced 180° according to the direction of, and proportional in amplitude to the difference between the position of the tool element and the reading of said indicator within a given range, means connected to receive said error signal for controlling the direction and speed of said motor according to the phase and amplitude, respectively, of said error signal so that the reading of said indicator is changed in correspondence with displacements of said tool element; and means for selectively setting said indicator to a desired reading independently of the position of said tool element, said last-named means including a center tapped transformer having a primary winding excited with alternating current and having a center tapped secondary winding with two output terminals, and means for simultaneously disconnecting said error signal from said controlling means and connecting the alternating current signal appearing on a selected one of said output terminals to said controlling means so that an artificial error signal of one phase or displaced 180° in phase is supplied to said controlling means to energize said motor and thereby drive said indicator to a desired reference reading.

10. In apparatus for indicating at a remote location the position of a machine tool element movable in opposite directions, the combination comprising, a synchro transmitter having a rotor driven by the tool element, a two-phase induction motor having first and second field windings, means for energizing the first field winding with an A.C. reference signal, a synchro receiver having a rotor driven by said motor, means including said transmitter and receiver for producing an A.C. error signal substantially proportional in amplitude to and of one phase or the opposite phase according to the sense of, the angular mis-match of said rotors, means responsive to said error signal for energizing said second winding so that the motor maintains said receiver rotor in positional agreement with said transmitter rotor, a numerical indicating device and means for driving the same from said motor; and means for adjusting the reading of said indicating device independently of said tool element, said last-named means including an alternating current excited transformer having a center-tapped secondary winding with two output terminals at its extremities, forward and reverse relays and means for selectively actuating the same, means responsive to actuation of either of said relays for disconnecting said error signal from said energizing means, and means responsive to actuation of respective ones of said relays for connecting a corresponding one of said output terminals to said energizing means, so that an artificial A.C. error signal of one phase or the opposite phase is supplied to said energizing means to cause said motor to drive said indicating device to a selected reference reading.

11. In apparatus for indicating at a remote location the position of a machine tool element movable in opposite directions, the combination comprising, a reversible two-phase induction motor having a first field winding adapted for connection to an A.C. reference signal, said motor having a second field winding, a synchro transmitter having a rotor geared to said tool element, a synchro receiver having a rotor driven by said motor, means including said transmitter and said receiver for producing an A.C. error signal proportional in amplitude and of a phase polarity relative to said reference signal corresponding, respectively, to the magnitude and sense of the angular mis-match of said rotors, a 90° phase shifting circuit receiving an error signal, means for supplying said error signal through said phase shifting circuit to said second field winding so that upon movement of the tool element the motor is energized to correspondingly reposition said receiver rotor; and means for changing the reading of said indicating device independently of movement of said tool element, said last-named means including a center-tapped transformer and means for selectively deriving therefrom an artificial error signal either in phase or 180° out of phase with said reference signal, and means for simultaneously disconnecting said error signal from, and supplying said artificial error signal through said phase shifting circuit to said second field winding to energize said motor.

References Cited in the file of this patent

UNITED STATES PATENTS

| | | |
|---|---|---|
| 2,099,463 | Bradley | Nov. 16, 1937 |
| 2,269,043 | Spaunburg | Jan. 6, 1942 |
| 2,583,747 | Potter | Jan. 29, 1952 |
| 2,596,698 | Laing et al. | May 13, 1952 |
| 2,655,629 | Lauricella et al. | Oct. 13, 1953 |
| 2,675,542 | Kress | Apr. 13, 1954 |
| 2,698,407 | Pease | Dec. 28, 1954 |
| 2,724,969 | Bloser | Nov. 29, 1955 |
| 2,738,497 | Harland et al. | Mar. 13, 1956 |
| 2,861,232 | Willems | Nov. 18, 1958 |
| 2,885,614 | Harris | May 5, 1959 |
| 2,939,061 | Keenan | May 31, 1960 |

OTHER REFERENCES

U.S. Navy Synchros, Ordnance Pamphlet #1303, December 15, 1944, pp. 111–124.